Sept. 20, 1971   C. R. VAN NIEL ET AL   3,605,846
FASTENING ASSEMBLY
Filed Sept. 24, 1969   2 Sheets-Sheet 1
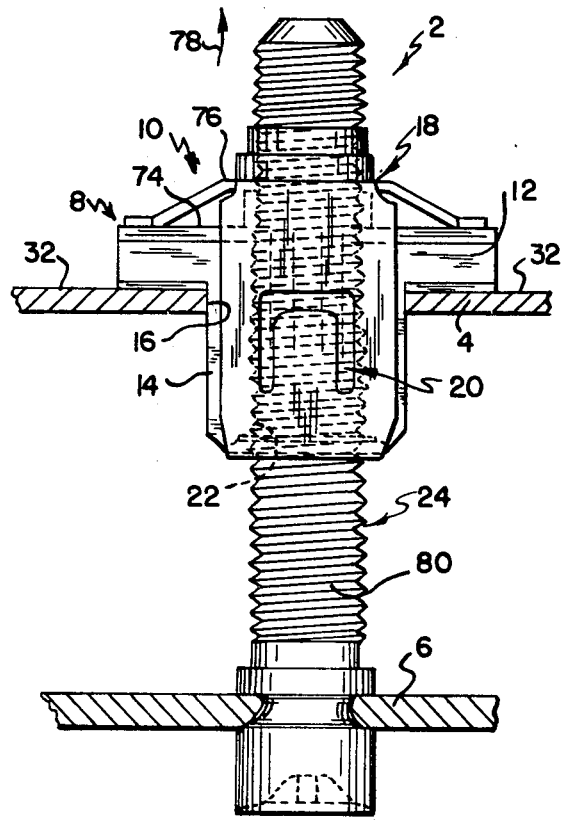
FIG. 1
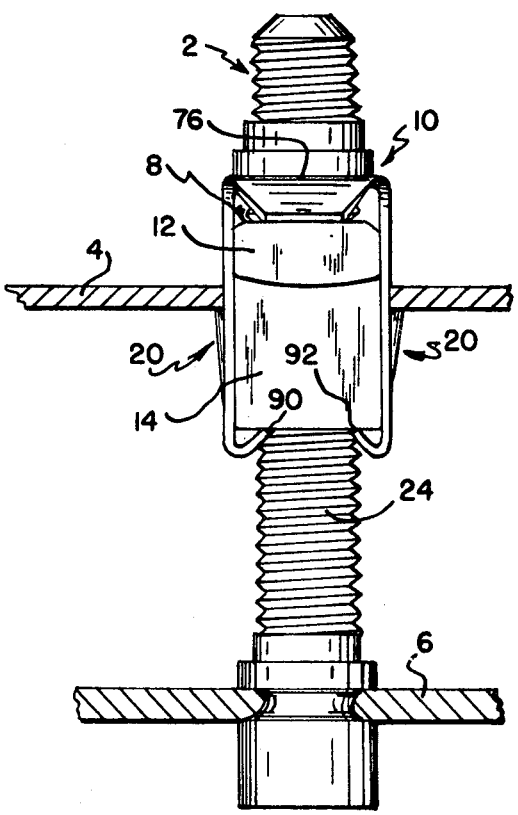
FIG. 2
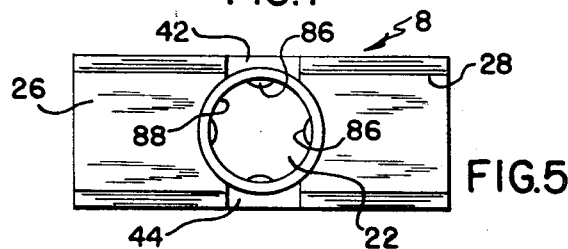
FIG. 5
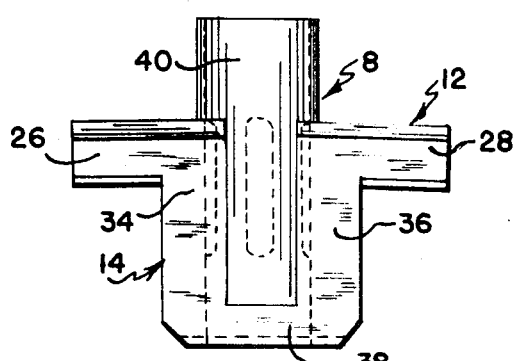
FIG. 3
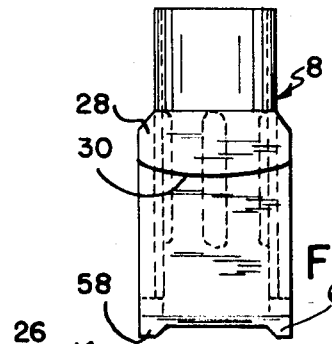
FIG. 4
FIG. 6
INVENTORS
CLARENCE R. VAN NIEL
WILLIAM L. SEITZ
BY
Teare, Teare & Sammon
ATTORNEYS Sept. 20, 1971   C. R. VAN NIEL ET AL   3,605,846
FASTENING ASSEMBLY
Filed Sept. 24, 1969   2 Sheets-Sheet 2
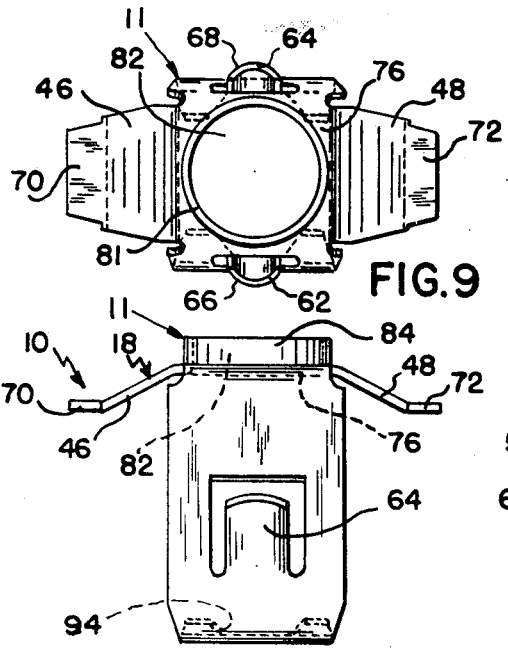
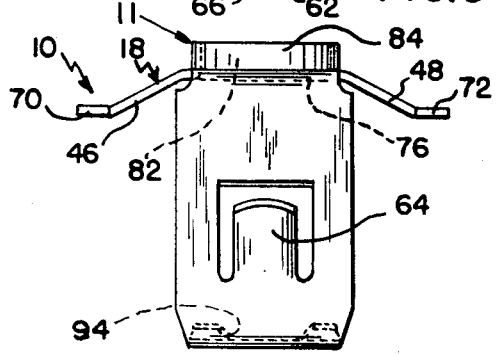
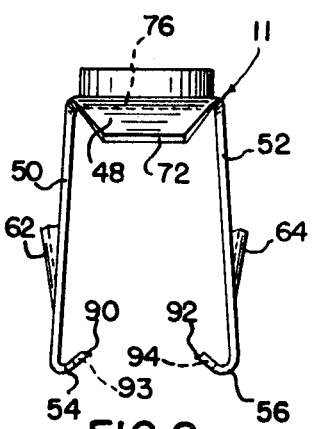
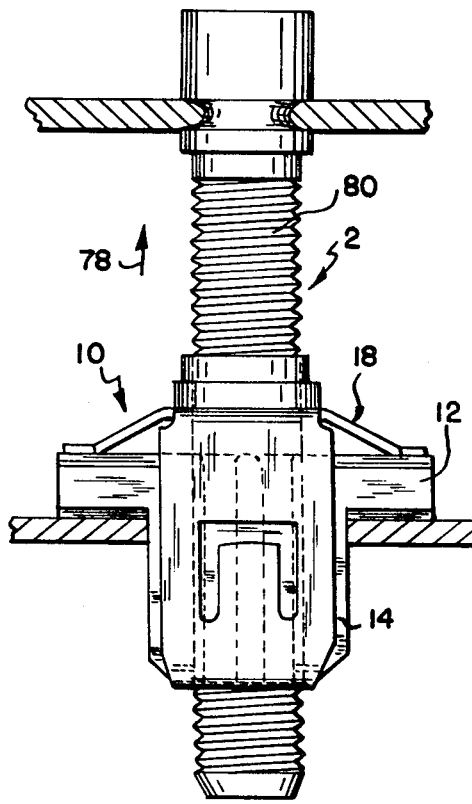
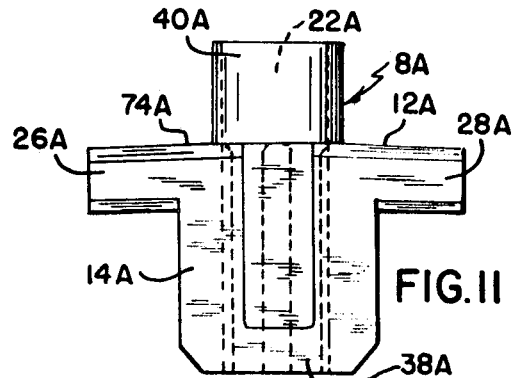
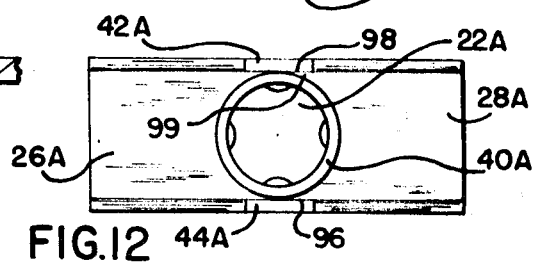
INVENTORS
CLARENCE R. VAN NIEL
WILLIAM L. SEITZ
BY
Teare, Teare & Sammon
ATTORNEYS United States Patent Office 3,605,846
Patented Sept. 20, 1971

3,605,846
FASTENING ASSEMBLY
Clarence R. Van Niel, North Olmsted, and William L. Seitz, Parma, Ohio, assignors to Eaton Yale & Towne Inc., Cleveland, Ohio
Filed Sept. 24, 1969, Ser. No. 860,764
Int. Cl. F16b 13/04, 39/284
U.S. Cl. 151—41.75
4 Claims

ABSTRACT OF THE DISCLOSURE

A fastening assembly for mounting with an apertured support panel including plug-like retainer member and attachable clip-like locking member adapted for resilient mounting on said retainer member. The retainer member and locking member are adapted for insertion through the aperture in the support member, as a unit, and coact with one another to secure the assembly to the support member. The locking member is provided with locking elements which are disposed for engagement with one side of the support panel, and a deformable base which is disposed for resilient engagement with the retainer member for interlocking engagement with the opposite side of the support member to enable relative movement of the locking member with respect to the retainer member and resilient mounting of the assembly with the support member.

BACKGROUND OF THE INVENTION

The present invention relates to fastening devices, and more particularly relates to a fastening assembly for resiliently mounting two panels or a panel and an article in adjustable, spaced relationship, such as in vehicle headlamp adjustment mountings. In the mounting of a vehicle headlamp, for example, substantial vibration is encountered which can cause maladjustment of the headlamp assembly. Heretofore, it has been known to provide various fasteners of the type which are adapted to receive a threaded member, such as a screw, for mounting another panel or article to a support member. In such prior devices the threaded member was threadably connected to a fastener device which was mounted in substantially rigid relation on the support member or the threaded member was utilized to expand the shank of a fastener member for securement of the fastener to the support member. Such prior art devices have not been entirely satisfactory in reducing such vibration effects. Still further, these devices could not accommodate a wide range of panel sizes and/or tolerance variation.

SUMMARY OF THE INVENTION

In the present invention, a fastening assembly is provided for mounting with an apertured support panel including a substantially rigid, plug-like retainer member and an attachable clip-like locking member which is adapted to be resiliently mounted on the retainer member. The locking member comprises a body having deformable locking elements disposed for engagement with one side of the support panel, and a deformable base disposed for a coacting engagement with the opposite side of the support member for resiliently mounting the assembly with the support member. The retainer member comprises a body having a substantially rigid head portion and a shank portion which depends downwardly from the head portion for insertion into the aperture in the support member. The head portion projects outwardly from the shank portion and is disposed for seating engagement with one side of the support member for locating the retainer member with respect to the support member when the device is in the inserted position. The locking member includes a pair of spaced leg members which depend downwardly from the base and adjacent the shank in the mounted position for interlocking engagement with the retainer member. The locking elements project outwardly from the legs and are disposed adjacent the shank portion and project outwardly therefrom so as to be disposed inwardly in a direction toward the shank portion upon insertion of the device into the aperture for snap-action interlocking engagement with the support member. The retainer member is provided with slots adapted to receive the locking elements therein upon deformation thereof. The head of the retainer member includes a sleeve-like attachment member projecting upwardly therefrom for movably mounting the end of the locking member adjacent the base to enable the locking member to move relative to the retainer member thereby to reduce vibrations in the assembled position of the device. An axial bore is provided in the retainer member and which extends length-wise thereof and adapted to receive an article or panel supporting element. The bore maye be threaded or unthreaded to receive an unthreaded or threaded panel supporting element, as desired.

BRIEF DESCRIPTION OF THE DRAWINGS

FIG. 1 is a side-elevation view of the fastening assembly of the present invention in the assembled portion thereof;

FIG. 2 is a side-elevation view looking from the right hand side of the fastening assembly shown in FIG. 1;

FIG. 3 is a side-elevation view of one embodiment of the retainer member of the fastening assembly of the present invention;

FIG. 4 is a side elevation in view taken from the right hand side of the member shown in FIG. 3;

FIG. 5 is a top plan view of the member shown in FIG. 3;

FIG. 6 is a bottom plan view of the member shown in FIG. 3;

FIG. 7 is a side-elevation view of the locking member of the present invention;

FIG. 8 is a side-elevation view taken from the right hand side of the member shown in FIG. 7;

FIG. 9 is a top plan view of the member shown in FIG. 7;

FIG. 10 is a side-elevation view of an other embodiment of the fastening assembly of the present invention;

FIG. 11 is a side elevation view of another embodiment of the retainer member of the present invention; and FIG. 12 is a top plan view of the retainer member shown in FIG. 11.

DESCRIPTION OF THE PREFERRED EMBODIMENTS

The fastening assembly of the present invention is illustrated, generally at 2 in FIG. 1, and is illustrated for mounting with an apertured support member 4, such as a panel or the like, for mounting and maintaining another panel or article, such as at 6, in adjustable, spaced relation with respect to the panel 4. As shown, the fastening assembly 2 comprises a substantially rigid, plug-like retainer member 8 and an attachable clip-like locking member 10 which is adapted for resilient mounting on the retainer member. The retainer member 8 includes a head 12 which is adapted for seated engagement with one side of the panel 4, and a shank portion 14 which depends downwardly from the head portion 12 and adapted for insertion through an aperture, such as 16, in the panel 4. The locking member 10 includes a resilient base portion 18 which is disposed for engagement with the head portion 12 on one side of the panel and locking elements 20 which are disposed adjacent the shank portion 14 on the opposite side of the panel 4 for interlocking engagement therewith. The retainer member 8 may be provided with an axial bore 22 which may extend longitudinally of the shank portion and adapted to receive an article or panel supporting element 24. By this arrangement, the locking member 10 coacts with the retainer member 8 to provide a positive attachment of the entire assembly to the panels while providing a resilient mounting which absorbs any vibrations imparted to and/or transmitted between the panels 4 and 6. In addition, the resilient nature of the locking member 10 enables the accommodation of variations in panel thickness tolerances. One size of retainer member may be used with a wide range of sizes of locking members to accommodate a wide range of panel sizes.

Referring now to FIGS. 3 and 5, the retainer member 8 comprises a unitary one-piece body member with the head 12 preferably defined by a pair of flanges 26 and 28 which extend outwardly and generally perpendicular with respect to the longitudinal central axis of the shank 14. The panel engaging or lower surface 30, as seen in FIG. 4, is preferably slightly arcuate in configuration to provide positive contact with the confronting or upper surface, such as 32, of the panel 4 (FIG. 1), as well as, enable a slight rocking movement of the device in the installed position to facilitate attachment of an article or support panel, such as at 6, to the device as will be more fully described hereinafter.

In the preferred form, the shank 14 is defined by a pair of laterally extending spaced-apart legs 34 and 36 which depend downwardly from the flanges 26 and 28, respectively. The legs 34 and 36 are joined at their distal ends remote from the head 12 by a bight portion 38 having the same widthwise dimensions as the legs 34 and 36 and giving the shank portion 14 a generally rectangular configuration, when viewed from the end remote from the head, as shown in FIG. 6.

The legs 34 and 36 are joined together throughout the remainder of their longitudinal dimension by a tube-like member 40 which is made integral with the bight portion 38 at its lower end and which projects upwardly beyond the head 12 at its opposite end to form a sleeve-like portion which is adapted for movably mounting one end of the locking member 10. Preferably, the tube-like member 40 has a maximum transverse diameter which is less than the transverse width of the shank portion 14 and flanges 26 and 28 thereby defining a pair of oppositely disposed slots 42 and 44 on opposite sides of the tube-like member which are adapted to receive the locking elements 20. Preferably, the slots 42 and 44 extend for substantially the full length of the shank portion 14 and have their lower ends commencing adjacent the blight portion 38 and extending upwardly through the head 12. This construction allows for slight deformation of the retainer body to provide a secure attachment with the panel 4.

The locking member 10 is shown disassembled in FIGS. 7, 8 and 9, and comprises a unitary, one-piece body member 11 which may be made out of any suitable material, such as sheet metal or the like. As shown in FIG. 7, the body 11 comprises a base 18 which is defined by a pair of thin resilient fingers 46 and 48 which project outwardly in a direction away from one another and a pair of spaced apart, oppositely disposed legs 50 and 52 which depend downwardly from opposite sides of the base 18. In the attached position, the legs 50 and 52 are disposed along the opposite sides of the shank 14 adjacent the slots 42 and 44, respectively (FIG. 2). As shown in FIG. 8, the legs 50 and 52 are connected at their upper ends to the base 18 and are free adjacent their opposite ends for pivotal movement about their connected ends. Preferably, the legs extend in generally parallel relationship and are slightly inclined with respect to one another in a direction away from the base 18 to enable the retainer member 8 to be readily inserted in the space therebetween. Preferably, the spacing adjacent the upper ends of the legs 50 and 52 is slightly greater than the corresponding transverse dimension of the retainer member to provide a snug fit when the locking member is installed on the retainer member. The free ends of the legs 50 and 52 are preferably bent inwardly in a direction toward one another and slightly upwardly to provide hook-like return bend portions 54 and 56, respectively, which are adapted for snap-action interlocking engagement with projections 58 and 60 disposed adjacent the lower end of the shank portion 14 remote from the head 12 to hold the locking member securely in position on the retainer member.

As shown in FIG. 8, each of the legs 50 and 52 is provided with the locking elements 20, which comprise finger-like elements 62 and 64 that project outwardly from the legs and are inclined upwardly away from one another in a direction toward the base 18. Preferably, the finger-like elements 62 and 64 are cut-out of the material of the legs and are connected at their lower ends and free adjacent their upper ends for pivotal movement inwardly in a direction toward one another about their connected ends.

As shown in FIG. 9, the finger-like elements 62 and 64 are preferably concavo-convex in configuration, when viewed in top plan, and have generally arcuate outer surfaces 66 and 68, respectively, adapted for camming coacting engagement with the marginal edge of the aperture 16 in the support panel 4. This arcuate structure provides additional compressive strength in the elements 62 and 64 for greater holding power in the installed position of the fastening assembly. Preferably, the finger-like elements 62 and 64 are disposed in axial alignment with the slots 42 and 44, respectively, so that they may pivot freely therein upon camming coaction with the confronting edges of the aperture 16.

Referring now to FIG. 7, the fingers 46 and 48 are preferably inclined slightly downwardly in a direction toward the legs and are provided with generally flat feet 70 and 72 adjacent their opposed ends which are disposed in substantially the same general plane being adapted for engagement with the confronting upper surface, such as at 74, of the head 12 of the retainer member 8. By this arrangement, the central portion 76 of the base between the feet 70 and 72 is raised or spaced from the surface 32, and therefore, any compressive force, such as indicated by the arrow 78 (FIG. 1) will cause the fingers to be deformed in the direction of the applied force. This enables the fastening assembly to be installed under compression and thereby absorb vibrations transmitted to the panel supporting member, such as a threaded screw 80. For example, and referring to FIG. 1, when the screw 80 is threaded into the bore 22 through the shank end first, any force (compression) on the screw in the direction of the arrow 78 will tend to deform the fingers in the same direction with respect to the central portion 76. Likewise, and referring to FIG. 10, if the screw 80 is inserted in the reverse direction, that is, through the head of the retainer member first, then any force (tensile) in the direction of the arrow 78 will have the same effect.

As shown in FIG. 9, the central portion 76 of the base 18 is provided with an opening 82 adapted to receive the portion of the tube-like member 40 which projects upwardly above the head 12 of the retainer member. Preferably, the opening 82, is configured substantially identical to the configuration of the tube-like member 40, such as circular, having a diameter slightly larger than the tube-like member 40 to enable the locking member to slide readily in an axial direction exteriorly of the tube-like member 40. As shown in FIGS. 7 and 8, an annular collar 84 is disposed adjacent the marginal edge of the opening 82, and preferably projects upwardly from the base 18 to provide additional strength for the base, as well as, a smoother confronting surface for sliding engagement along the tube-like member 40.

Preferably, ribs 86 extend longitudinally of the bore 22 and are adapted for threaded engagement with the threads of the screw 80. Preferably, the ribs 86 are disposed in pairs on opposite sides of the bore having the transverse distance therebetween less than the maximum transverse dimension of the threads of the screw 80. In addition, the diameter of the bore 22 may be larger or smaller than the maximum transverse dimension of the threads of the screw 80 to enable the screw 80 to be held solely by the ribs or partially by the tube-like member 40. In the latter instance, the spacing between adjacent ribs, such as at 88, provides a relief area for receiving material cut out of the tube-like member upon threading of the screw 80 into the retainer member 8.

Referring now to FIGS. 7 and 8, the inner ends 90 and 92 of the hook-like portions 54 and 56, respectively, are preferably spaced apart from one another a distance which is less than the maximum transverse diameter of the threads of the screw 80. To enable the screw 80 to pass between these inner ends, the respective hook-like portions 54 and 56 are provided with cut-out portions 93 and 94 which define a circle having a diameter larger than the maximum diameter of the threads of the screw 80. As a result of this structure, the hook-like portions 54 and 56 of the legs will not interfere with the threads of the screw 80. This arrangement permits the use of relatively smaller retainer members than could otherwise be used should the cut-out portions 93 and 94 not be provided.

Referring now to FIGS. 11 and 12, there is shown another embodiment of the retainer member 8a of the present invention. As shown, a cylindrical tube-like member 40a commences adjacent the upper surface 74a of the head 12a and projects upwardly in a direction away from the shank portion 14a. Slots 42a and 44a are formed in the body of the retainer member 8a on opposite sides of the bore 22a and extend upwardly from the bight-portion 38a through the head 12a. Preferably, the slots 42a and 44a are generally rectangular in configuration and have generally parallel inner walls 96 and 98, respectively, with the transverse distance therebetween being approximately equal to the maximum diameter of the tube-like member 40a. By this arrangement, the portion of the flanges, such as at 99, provides additional structural strength for that portion of the tube-like member 40a disposed intermediate the flanges 26a and 28a and adjacent these slots 42a and 44a.

We claim:

1. A fastening assembly adapted for mounting with an apertured support member comprising
   a plug-like retainer member and an attachment clip-like locking member resiliently mounted on said retainer member,
   said locking member including deformable locking elements disposed for interlocking engagement with one side of said support member,
   a deformable base disposed for coacting engagement with the opposite side of said support member for resiliently mounting said fastener assembly with the support member,
   said retainer member comprising a body,
   said body having a substantially rigid head portion and a shank portion which depends downwardly from said head portion and adapted for insertion into the aperture in said support member,
   said head portion projects outwardly from said shank portion and is disposed for seating engagement with one side of said support member for locating said retainer member with respect to said support member,
   said locking member includes a pair of spaced leg members depending downwardly from said base adjacent said shank portion being adapted for interlocking engagement with said retainer member,
   said locking elements project outwardly from said leg members adapted for snap-action engagement with said support member,
   the body of said locking member is made from a relatively thin material,
   said locking elements are formed from the material of said body and are pivotally connected to said leg members at one end remote from said base,
   said base of said locking member is defined by a pair of resilient finger members being integrally joined at a generally central portion and projecting outwardly in a direction away from one another,
   said finger members disposed in resilient engagement with said retainer member head, and said central portion being spaced from said retainer member head to enable said locking member to move relative to said retainer member,
   said retainer member includes projections adjacent the lower end of said shank, and
   said locking member including return bend portions adjacent the lower end of said legs disposed in snap-action interlocking engagement with said projections in the mounted position of said locking member on said retainer member.

2. A fastening assembly in accordance with claim 1, wherein
   said retainer member includes a pair of slots disposed on opposite sides of said body which extend longitudinally thereof and in aligned relation with respect to said locking elements and adapted to receive said locking elements upon deformation thereof.

3. A fastening assembly in accordance with claim 1, wherein
   said retainer member includes an attachment member projecting upwardly therefrom for moveably mounting said locking member to enable relative movement of said locking member with respect to said retainer member.

4. A fastening assembly in accordance with claim 1, wherein
   said retainer member includes an axial bore adapted to receive an article supporting element therein.

References Cited

UNITED STATES PATENTS

| | | | |
|---|---|---|---|
| 2,368,027 | 1/1945 | Johnson | 85—80 |
| 2,516,981 | 8/1950 | Hall et al. | 151—41.75 |
| 2,717,749 | 9/1955 | Flora | 248—27 |
| 2,875,805 | 3/1959 | Flora | 151—41.76 |
| 3,126,039 | 3/1964 | Fiddler | 85—80 |
| 3,139,251 | 6/1964 | Walsh | 248—27 |
| 3,373,789 | 3/1968 | Parkin et al. | 151—41.75 |
| 3,415,155 | 12/1968 | Riddell et al. | 85—80 |
| 3,508,593 | 4/1970 | Gill | 151—41.75 |

FOREIGN PATENTS

| | | | |
|---|---|---|---|
| 663,113 | 12/1951 | Great Britain | 151—41.75 |
| 948,673 | 1/1949 | France | 151—41.75 |
| 1,396,724 | 3/1965 | France | 151—41.76 |

MARION PARSONS, Jr., Primary Examiner

U.S. Cl. X.R.

85—80